United States Patent [19]

Murakami

[11] Patent Number: 5,050,963
[45] Date of Patent: Sep. 24, 1991

[54] METHOD FOR SECURING OPTICAL PARTS TO A SUPPORT MEMBER AND A RING MEMBER FOR USE THEREIN

[75] Inventor: Kazuo Murakami, Higashihiroshima, Japan

[73] Assignee: Sharp Kabushiki Kaisha, Osaka, Japan

[21] Appl. No.: 594,708

[22] Filed: Oct. 9, 1990

[30] Foreign Application Priority Data

Oct. 12, 1989 [JP] Japan ............................. 1-120036[U]

[51] Int. Cl.$^5$ ................................................ G02B 7/02
[52] U.S. Cl. .................................. 359/808; 359/819; 359/900
[58] Field of Search ............... 350/242, 245, 247, 252, 350/255, 320, 253, 257

[56] References Cited

U.S. PATENT DOCUMENTS

| 4,586,787 | 5/1986 | Fiandra et al. | 350/257 |
| 4,723,833 | 2/1988 | Yamada | 350/252 |
| 4,733,945 | 3/1988 | Bacich | 350/253 |

FOREIGN PATENT DOCUMENTS

| 202414 | 11/1984 | Japan | 350/242 |
| 64-13019 | 1/1989 | Japan . | |
| 64-42521 | 3/1989 | Japan . | |

*Primary Examiner*—Paul M. Dzierzynski
*Assistant Examiner*—Loha Ben
*Attorney, Agent, or Firm*—Nixon & Vanderhye

[57] ABSTRACT

A method for securing optical parts together with a ring member enclosing it and functioning as a balance weight and/or a lens guard member to a support member with adhesive. The ring member is provided therein with at least one groove formed through the wall of the ring member by cutting away one portion thereof, and the optical parts, the ring member and the support member are disposed so that the optical parts and the support member may be respectively positioned adjacent both ends of the groove, and those three members are secured with adhesive applied onto the groove. With the method, those three members are simply secured to one another in one process.

7 Claims, 3 Drawing Sheets

METHOD FOR SECURING OPTICAL PARTS TO A SUPPORT MEMBER AND A RING MEMBER FOR USE THEREIN

FIELD OF THE INVENTION

The present invention relates to a method for securing onto a support member with adhesive comparatively small-sized optical parts of various kinds such as an objective lens of an optical head installed, for example, in a device for optically recording/reproducing information, and notably to a ring member for use in the method.

BACKGROUND OF THE INVENTION

An objective lens which is one of optical members for use in an optical head is disposed such that by controlling the position thereof along an optical axis and in a perpendicular direction to the optical axis, a laser beam can be adjusted to focus on an accurate spot on a track of a recording medium. In the arrangement, the objective lens is secured onto an objective lens support member with adhesive, which is movably supported to a base plate. Generally, the objective lens support member is adjusted in its weight balance by a balance weight provided therein so as to maintain its stable neutral position and to allow its stable shifting without tilting the optical axis. Further, depending on the movable supporting structure of the support member, the balance weight is sometimes designed to be ring-shaped and disposed in such a position as to be coaxial with the objective lens in order to bring its center of gravity to the optical axis of the objective lens. Furthermore, in some of those systems, in order to avoid unnecessary contact of the surface of the objective lens with other members and the like, a ring-shaped lens guard member is attached thereto. The ring-shaped balance weight and lens guard member, or the member having both of the functions are secured onto the support member with adhesive as well as the objective lens.

Referring to FIG. 6 and FIG. 7, the following description will discuss a concrete example of the prior art with respect to the above structure.

As shown in the drawings, an objective lens 21 is secured inside a ring member 22 serving as a balance weight and a lens guard member by the use of adhesive, and the ring member 22 is further secured on a support member 23 by the use of adhesive. As shown in FIG. 6, the support member 23 is fixed to a base plate (not shown) through a pair of focusing direction use plate springs 24a, 24b, a junction member 25, a pair of tracking direction use plate springs 26a, 26b and a pair of supporting blocks 27a, 27b, and is allowed to move in directions indicated by F (for focusing) and T (for tracking) in FIG. 6 by the function of the plate springs 24a, 24b, 26a, 26b. A focusing coil 28 and a pair of tracking coils 29a, 29b are also fixed to the support member 23, and those coils permit it to be shifted in the direction F or T by their interaction with a magnetic circuit fixed to the base plate (not shown).

Meanwhile, in the above holding structure with respect to objective lens, both the objective lens 21 and the ring member 22 are secured to the support member 23 so as to be coaxial, and in that case two processes of adhesive bonding are necessary between the objective lens 21 and the ring member 22 as well as between the ring member 22 and the support member 23, thereby requiring time-consuming work in those processes. Moreover, especially in the adhesion of the objective lens 21 and the ring member 22, since a surface-to-surface adhesion is performed between comparatively large areas, usable adhesives are limited and skilled workers are required in the process.

SUMMARY OF THE INVENTION

It is an object of the present invention to provide a securing method for optical parts, whereby optical parts such as an objective lens can be secured onto a support member with adhesive only in one process by using a ring member.

It is another object of the present invention to provide a ring member for securing optical parts to a support member only in one process.

In order to achieve the above objects, the present invention provides the ring member with at least one groove formed through the sidewall of the ring member by cutting therein in a direction substantially parallel to an optical axis of the optical parts. Further, in this method according to the present invention, when the optical parts and the ring member enclosing the optical parts, which is fixed to the support member, are secured onto the support member with adhesive, since the ring member is disposed so that its inner surface may contact with the peripheral wall of the optical parts and its outer surface may be positioned adjacent the upper surface of the support member, the above three members are secured by applying adhesive to the groove.

With the arrangement, when adhesive is fully applied to the groove after positioning the three members, the adhesive spreads simultaneously to the optical parts and support member, both contacting with the edges of the groove, thereby making it possible to secure the three members to one another with the adhesive at the same time.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view showing an objective lens support assembly in an optical head.

FIG. 2 is a perspective view showing essential parts disassembled one another of the objective lens support assembly of FIG. 1.

FIG. 3 is a perspective view showing a state of the members of FIG. 2 secured one another with adhesive.

FIG. 4 is a perspective view showing essential parts disassembled one another of an objective lens support assembly in the optical head.

FIG. 5 is a perspective view showing a state of the members of FIG. 4 secured one another with adhesive.

FIG. 6 is a perspective view showing an objective lens support assembly in an optical head.

FIG. 7 is a perspective view showing essential parts disassembled one another of the objective lens support assembly.

DETAILED DESCRIPTION OF THE EMBODIMENTS

Figure 1:
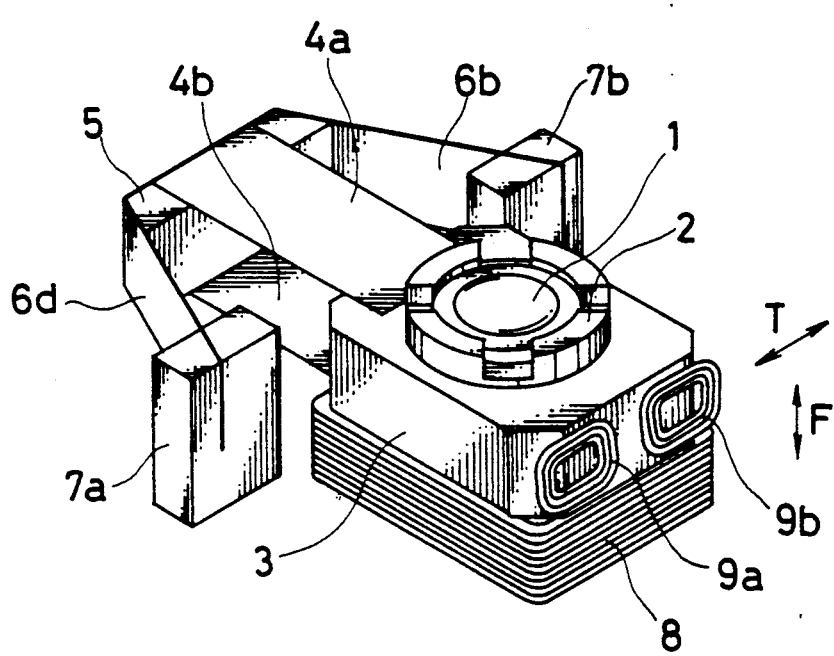
FIGS. 1 to 3 show one preferred embodiment of the present invention.
Figure 2:
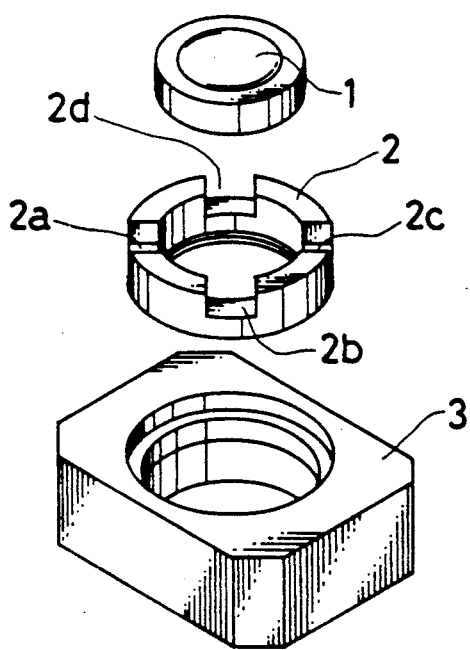
Figure 3:
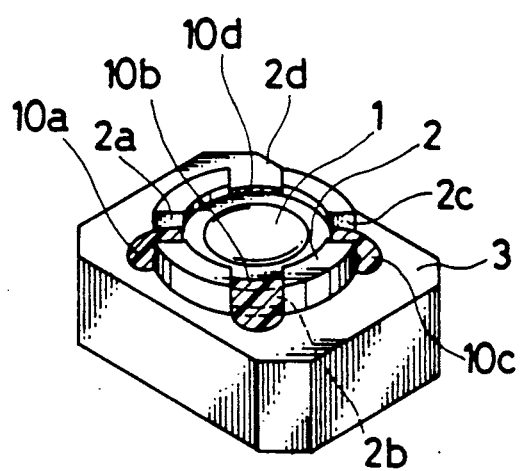

The following description will discuss one preferred embodiment of the present invention applied to an objective lens of an optical head, referring to FIGS. 1 to 3.

As with the prior art, a support member 3 is movably fixed to a base plate (not shown) through a pair of plate springs 4a, 4b, a junction member 5, a pair of plate springs 6a, 6b and a pair of supporting blocks 7a, 7b, and is allowed to shift its position in the directions indicated by F and T by a focusing coil 8 and tracking coils 9a, 9b, as is shown in FIG. 1. An objective lens 1 and a ring member 2 are secured onto the support member 3 with adhesive. The ring member 2 functions as a balance weight and a lens guard member for protecting the objective lens 1. As shown in FIG. 2, the ring member 2 is provided therein with a plurality of grooves 2a, 2b, 2c, 2d, each formed through its sidewall by cutting therein in a direction parallel to an optical axis when fixed to the support member 3.

When the objective lens 1 is secured onto the support member 3 together with the ring member 2, first the three members are assembled as illustrated in FIG. 3. At this time, the three members are disposed so that each of the inside ends of the grooves 2a, 2b, 2c, 2d may contact with the peripheral wall of the objective lens 1 and each of the outside ends thereof may be positioned adjacent the upper surface of the support member 3. Next, in this pre-secured state, adhesive 10a, 10b, 10c, 10d is fully applied to each of the grooves 2a, 2b, 2c, 2d, as is shown in FIG. 3. As a result, through the adhesive 10a, 10b, 10c, 10d, the peripheral wall of the objective lens 1, the grooves 2a, 2b, 2c, 2d and the upper surface of the support member 3 are fastened one another, thereby making it possible to secure the three members to one another with adhesive at the same time.

Figure 4:
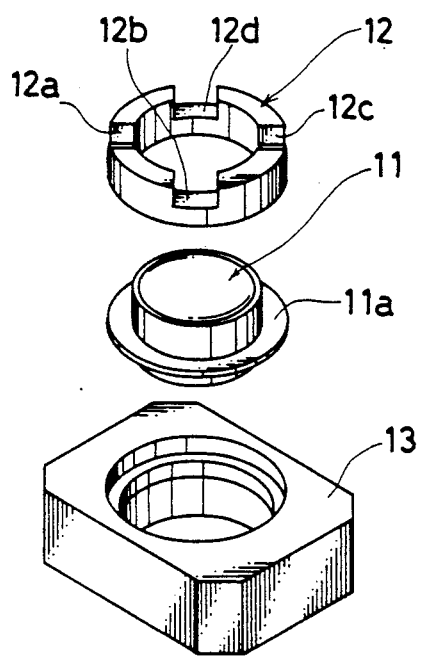
FIG. 4 and FIG. 5 show another embodiment of the present invention.
Figure 5:
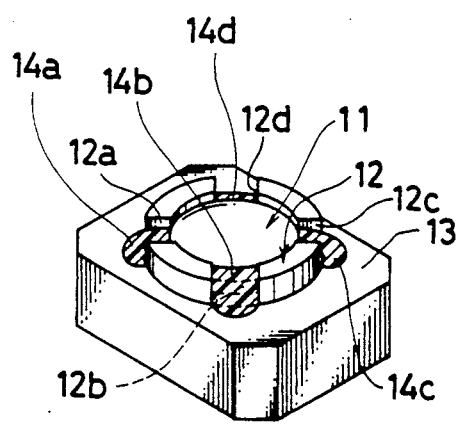
Figure 6:
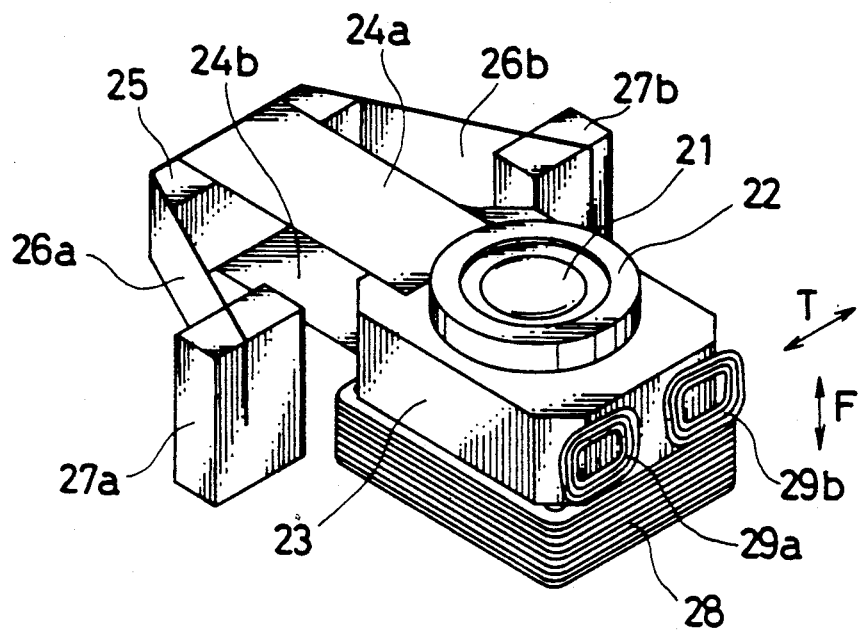
FIG. 6 and FIG. 7 show the prior art.
Figure 7:
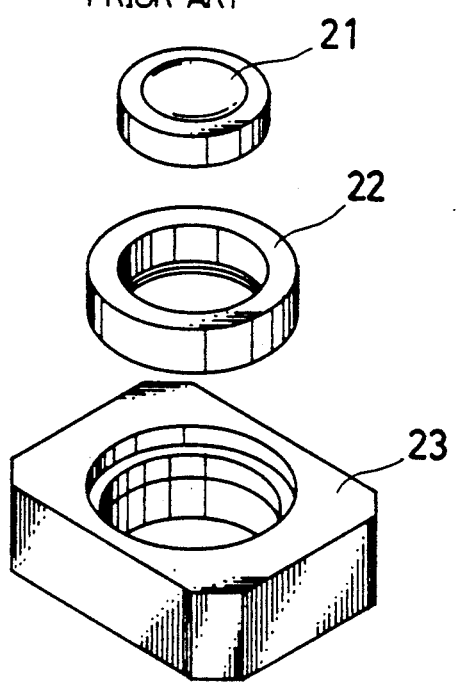

Further, the following description will discuss another embodiment of the present invention referring to FIGS. 4 and 5. Also in this embodiment, the present invention is applied to an objective lens of an optical head.

In this embodiment, an objective lens 11 having a flange portion 11a formed on the peripheral wall thereof is employed. Moreover, as with the aforementioned embodiment, a ring member 12 functioning as a balance weight and a guard member of the objective lens 11, is provided therein with a plurality of grooves 12a, 12b, 12c, 12d, each formed through its sidewall by cutting therein in a direction parallel to an optical axis when fixed to a support member 13, as shown in FIG. 4.

When the objective lens 11 is secured to the support member 13 with the ring member 12, first the objective lens 11 is disposed on the support member 13, and then the ring member 12 is disposed thereon so as to cover the flange portion 11a. At this time, those members are arranged such that both the peripheral wall of the objective lens 11 and the upper surface of the support member 13 may be positioned adjacent the inside and outside ends of each of the grooves 12a, 12b, 12c, 12d of the ring member 12. Next, adhesive 14a, 14b, 14c, 14d is fully applied to each of the grooves 12a, 12b, 12c, 12d. With the arrangement, the peripheral wall of the objective lens 11, each of the grooves 12a, 12b, 12c, 12d and the upper surface of the support member 13 are fastened with the adhesive, thereby making it possible to secure the three members of the objective lens 11, ring member 12 and support member 13 to one another at the same time.

Additionally, in each of the embodiments described above, the explanation is given of an example wherein an objective lens of an optical head is secured with a ring member as a balance weight or a guard member; yet optical parts and a ring member are not limited to these, and the present invention is applicable to various optical parts.

Moreover, in the example, four grooves are made in the ring member; yet the present invention is not limited to the arrangement, and another number of grooves may be made as long as an adhesive strength required for fixedly securing the objective lens, ring member and support member is obtained.

As described above, according to the present invention, since application of adhesive to a groove enables those three members of optical parts, a ring member and a support member to be fastened to one another at the same time, the three members can be secured only in one process. Accordingly, two processes required in the conventional securing operation with adhesive can be reduced to one, thereby simplifying the operation drastically.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A method for securing optical parts together with a ring member enclosing the optical parts to a support member, comprising the steps of:

providing the ring member having at least one groove formed through a sidewall thereof;

disposing the optical parts, the ring member and the support member so that an inner surface of the ring member may contact with a peripheral wall of the optical parts and an outer surface of the ring member may be positioned adjacent an upper surface of the support member; and fixedly securing one portion of the peripheral wall of the optical parts, the groove of the ring member and one portion of the upper surface of the support member to one another by applying an adhesive to the groove.

2. A method as set forth in claim 1, wherein the ring member is provided therein with a plurality of grooves, each formed through the sidewall of the ring member by cutting therein in a direction substantially parallel to an optical axis of the optical parts when secured to the support member.

3. A method as set forth in claim 1, wherein the ring member is a balance weight and/or a guard member of the optical parts.

4. A method as set forth in claim 1, wherein the optical parts are an objective lens for use in an optical head.

5. An optical parts holding assembly for securing to one another with adhesive optical parts, a support member whereto the optical parts are fixed and a ring member enclosing the optical parts, which is fixed to the support member, wherein the ring member is provided therein with at least one groove formed through a sidewall of the ring member by cutting therein in a direction substantially parallel to an optical axis of the optical parts when secured to the support member; and the optical parts and the other two members are disposed so that an inner surface of the ring member may contact with a peripheral wall of the optical parts and an outer surface of the ring member may be positioned adjacent an upper surface of the support member, and one portion of the peripheral wall, one portion of the upper surface and the groove are secured to one another with an adhesive.

6. An optical parts holding assembly as set forth in claim 5, wherein the ring member is a balance weight and/or a guard member of the optical parts.

7. An optical parts holding assembly as set forth in claim 5, wherein the optical parts are an objective lens installed in an optical head.

* * * * *